US008738433B2

(12) United States Patent
DiOrio et al.

(10) Patent No.: US 8,738,433 B2
(45) Date of Patent: May 27, 2014

(54) METHOD AND SYSTEM FOR TARGETED ADVERTISING

(75) Inventors: Peter A. DiOrio, Dallas, TX (US); Zachary D. Buckner, Charlottesville, VA (US); John F. Elder, IV, Charlottesville, VA (US)

(73) Assignee: POI Development Co., LLC, Eastham, MA (US)

( * ) Notice: Subject to any disclaimer, the term of this patent is extended or adjusted under 35 U.S.C. 154(b) by 344 days.

(21) Appl. No.: 12/464,453

(22) Filed: May 12, 2009

(65) Prior Publication Data
US 2010/0293052 A1    Nov. 18, 2010

(51) Int. Cl.
G06Q 30/00    (2012.01)
G06Q 90/00    (2006.01)

(52) U.S. Cl.
CPC ..................................... *G06Q 90/00* (2013.01)
USPC ...................................................... 705/14.1

(58) Field of Classification Search
CPC .................................................... G06Q 90/00
USPC ....................................................... 705/14.1
See application file for complete search history.

(56) References Cited

U.S. PATENT DOCUMENTS 5,991,735 A * 11/1999 Gerace ......................... 705/7.33
7,630,986 B1 * 12/2009 Herz et al. ............................ 1/1
2008/0033805 A1 * 2/2008 Padin .............................. 705/14

* cited by examiner

Primary Examiner — Daniel Lastra
(74) Attorney, Agent, or Firm — W. Edward Ramage; Baker Donelson

(57) ABSTRACT

A method and system of displaying advertisements may include generating a predictive model to predict a type of user, collecting advertisements based upon the type of user, placing the predictive model and collected advertisements on a computer of a user, executing the predictive model on the computer of the user to determine the type of user, and selecting an advertisement to be displayed to the user based upon the execution of the predictive model. The predictive model may be generated based upon feedback from the control users, and the predictive model may be generated based upon the computer of the control users. The predictive model may be generated based upon Web browsing of the computer of the control users, and the predictive model may be generated based upon computer usage behavior of the control users.

19 Claims, 2 Drawing Sheets

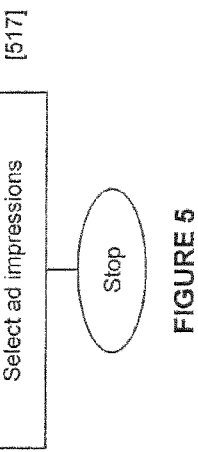
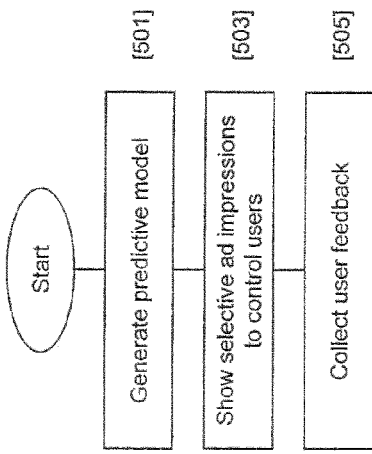
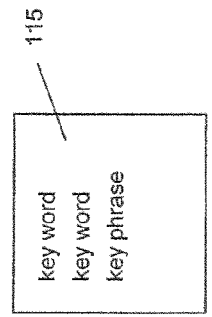
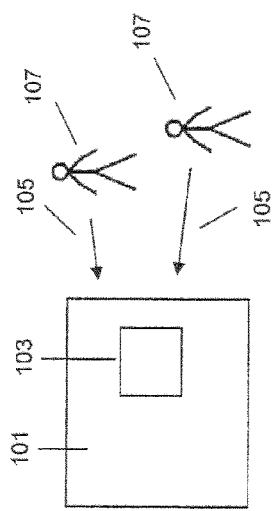
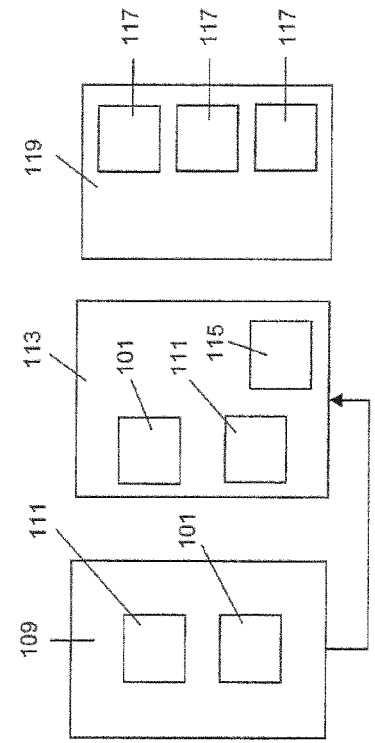
FIGURE 5
FIGURE 2
FIGURE 3
FIGURE 4

METHOD AND SYSTEM FOR TARGETED ADVERTISING

FIELD OF INVENTION

This invention relates to a method and system for targeted advertising and more particularly to a method and system for targeted advertising that leverages end-users' personal computer data while maintaining end-user privacy.

BACKGROUND OF THE INVENTION

Internet advertising is a large and rapidly growing industry. eMarketer Daily has calculated that the market for online advertising reached $21.4 billion for 2007, and projected that revenues will hit $42 billion by 2011, a compound annual growth rate of 15 approximately 18.4 percent.

As ad spending increases, there has been continued investment in techniques to deliver more targeted advertising and displaying advertisements that better match end user's own interests. This makes advertisements more useful to the viewer, while increasing click-through rates, conversion, and corresponding profitability for advertisers.

However, there has been increasing concern over the privacy implications of current techniques for tracking and targeting. Recently, new legislation has been introduced in the United States and Europe to try to control data that web servers are collecting from users in order to deliver more targeted advertisements.

Currently, targeted advertising is done primarily using "cookie" technology, which works by passing a token, known as a cookie, from web server to web browser upon the browser's first visit to the site. This token is returned by the browser to the server every time a user clicks a new link within the same domain. This simple technology allows web servers to maintain detailed logs of "who went where" on their sites.

Current targeted advertising sifts through past content that was displayed to a user, and displays advertisements based not only on the current page content, but also on the user's past browsing history. This concept has been further extended, with companies now consolidating web browsing history across sites. Though historically Yahoo.com only had access to a user's browsing history under the Yahoo.com domain name, other companies have begun assembling a portfolio of this history across many different sites. In turn, these companies can sell the information to other websites and other interested parties. For instance, LLbean.com not only knows that someone has viewed a green sweater on their site, but also that that person has been viewing advertisements on eBay for golf clubs. So, LL Bean would be more likely to show that person a golfing shirt than it otherwise would have.

In addition to privacy concerns surrounding the current state-of-the-art, this solution leaves significant targeting opportunities untapped. It also does not have access to the richer targeting data that is on a customer's own local computer, which may better guide decisions about what advertisements are relevant. But because of the level of concern even on server-side targeted advertisements, current computing users would be hesitant to install local software that could divulge sensitive personal information to the outside world.

SUMMARY

A method and system of displaying advertisements may include generating a predictive model to predict a type of user, collecting advertisements based upon the type of user, placing the predictive model and collected advertisements on a computer of a user, executing the predictive model on the computer of the user to determine the type of user, and selecting an advertisement to be displayed to the user based upon the execution of the predictive model.

The predictive model may be generated based upon feedback from the control users, and the predictive model may be generated based upon the computer of the control users.

The predictive model may be generated based upon Web browsing of the computer of the control users, and the predictive model may be generated based upon computer usage behavior of the control users.

The predictive model may generate a keyword, and the key word may be formed in a time weighted list, and the predictive model may generate a key phrase.

The key phrase may be formed in a time weighted list.

DESCRIPTION OF THE DRAWINGS

The invention may be understood by reference to the following description taken in conjunction with the accompanying drawings, in which, like reference numerals identify like elements, and in which:

FIG. 2 illustrates the construction of the predictive model of the present invention.

FIG. 3 illustrates the downloading of the predictive model and advertisements to the user's computer.

FIG. 4 illustrates the profile on the users computer.

FIG. 5 illustrates the operation of the present invention.

DETAILED DESCRIPTION OF THE INVENTION

Figure 1:
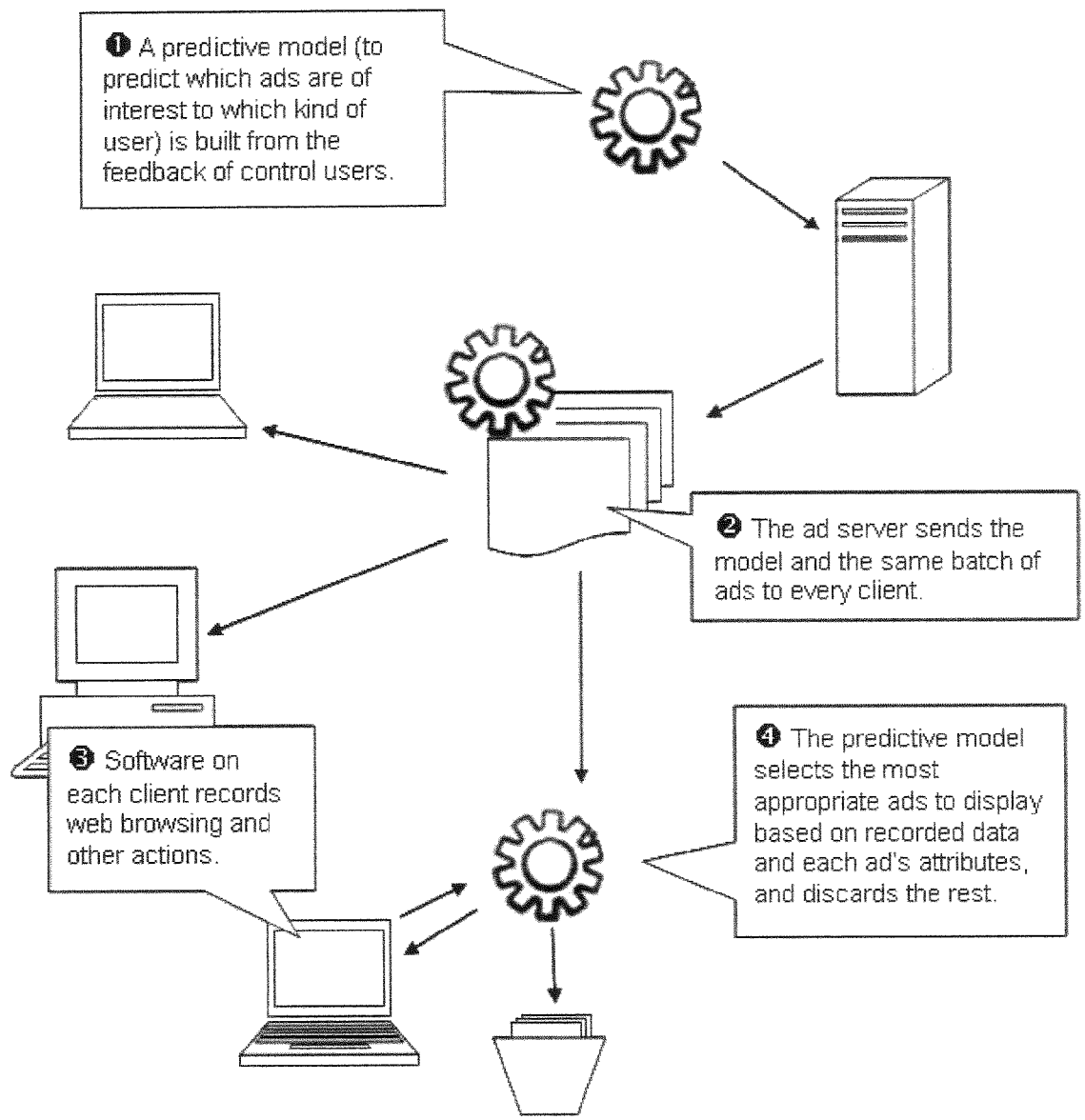
FIG. 1 is a diagram of a system in accordance with one embodiment of the present invention

FIG. 1 shows an exemplary embodiment of the present invention, comprising an advertisement server, a collection of multiple advertisements, and a network of end user client computers, each running a client-size software package. Although the present invention speaks in terms of computers, other types of electronic devices such as cell phones, blackberries, PDAs, laptops, personal computers or other types of electronic devices are within the scope of the invention. The advertisements may be paid advertisements, free advertisements, solicited advertisements unsolicited advertisements or other types of advertisements. The system uses a predictive model 101 to predict which advertisements may be of interest to certain kinds of users, then distributes batches of advertisements from the advertisement server to end user computers. The software package on the end-user computer then selects which ads to display based on a user profile developed for that user.

The first step in the method of the present invention is the development of the predictive model 101. By showing selective ads 103, the control users 107 develop an impression and provide feedback 105 based on the selected ad shown to the control users 107. Using the feedback 105 of control users 107, the predictive model 101 is created to predict which kinds of advertisements are interesting to various kinds or classes of users. Control users 107, who may be paid, allow the model 101 to observe their web browsing and computer usage behavior. They are then shown or exposed to various advertisements 103 with different attributes. The control users 107 then are asked how interested they are in what the advertisements are advertising. The control users' responses or feedback 105 to the advertising also may be determined using other methods known in the art. This feedback 105 may be used to develop and train the model 101 so that the predictive model 101 can predict what type of user profile (based at least in part on the software package's observation of the control user's computer usage) would be interested in which kinds of ads (as determined by each ad's attributes). Consequently, the predictive model 101 can determine the type of user based upon the analysis of the user's computer. The predictive model 101 can then provide an effective or interesting ad to the user based upon the type of user.

The second step is the collection of advertisements 111 on the advertisement server 109, and the downloading of advertisements 111 in batches to subscribed client computers 113 and cached. The predictive model 101 common to all users also is downloaded (or updated through downloads).

Downloading may be continual or periodic. Downloading may be initiated from the ad server or by the client computer. Even large batches of advertisements 111 do not present a significant bandwidth problem using current technology.

Google, for example, generates the majority of its revenue from textual advertisements that are less than 100 bytes each. Given the United States' current average in-home broadband speed of 4.8 Mbps, over 50,000 candidate advertisements 111 could be transferred to an end-user's computer 113 in a single second.

In the third step, the software package including the predictive model 101 that runs on each client computer 113 develops a profile 115 for the user based on the user's computer usage. In one embodiment, the profile 115 may comprise a time-weighted list of keywords or key phrases extracted from recently viewed web pages or emails on the computer 113 of the user. The completed profile 115 should be representative of the user's interests, and is used as an input to the predictive model 101 to rank incoming advertisements 111 by degree of relevance.

In the fourth step, on each client computer the collection of cached advertisements 111 is constantly sorted, according to the degree of match with the locally-stored profile 115. The degree of match is determined by using the user's profile and each advertisement's attributes as inputs into the predictive model 101 and calculating a relevance score for each advertisement 111. As users make use of browsing technology from their client computer, ads are selected from the ordered list of advertisements, and directly placed into advertisement placeholders 117 which may be located on the screen 119 of the user. The advertisement placeholders 117 may reside on free applications or "widgets" that are downloaded by users, or directly in web pages themselves.

In one exemplary embodiment, all communication over the network is one way, and no information about the profile ever leaves the local computer 113. Thus, users can feel confident that their locally stored profile 101 will never be compromised. And because all advertisements are always downloaded (regardless of the users' interest in the advertisements), it is impossible to deduce the user's profile by monitoring the advertisements chosen for downloading and display.

FIG. 5 illustrates the operation of the present invention. In step 501 the predictive model 101 is generated, and in step 503, selective ads are shown to control users.

In step 505, feedback is collected from the control users, and in step 507 the predictive model is created. In step 509, advertisements are collected, and in step 511, the ads and predictive model is downloaded to the client computer. In step 513, the predictive models run on the users computer to develop a profile, and in step 515, a time weighted list of keywords and/or key phrases are generated. In step 517, ads are selected to be placed on the users computer.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The invention claimed is:

1. A method of displaying advertisements, comprising the steps of:
    placing a predictive model and a group of collected advertisements on a computer or other electronic device of a user, wherein the predictive model is created without using any demographic or psychographic profile information of the user;
    executing the predictive model on the computer or other electronic device of the user to determine the type of user; and
    selecting an advertisement to be displayed to the user based upon the execution of the predictive model;
    wherein information about the type of user determined by the predictive model is stored on the computer or other electronic device of the user and is not communicated over a network.

2. A method of displaying advertisements as in claim 1, wherein the predictive model is generated based upon feedback from a group of control users.

3. A method of displaying advertisements as in claim 1, wherein the group of collected advertisements placed on the user's computer or other electronic device is the same for all users, and does not vary based upon user type.

4. A method of displaying advertisements as in claim 1, further comprising the step of periodically downloading additional groups of collected advertisements to the user's computer or other electronic device.

5. A method of displaying advertisements as in claim 1, wherein the predictive model is generated based upon computer or other electronic device usage behavior of a group of control users.

6. A method of displaying advertisements as in claim 1, wherein the predictive model generates a keyword.

7. A method of displaying advertisements as in claim 6, wherein the predictive model further generates a time-weighted list of keywords or key phrases.

8. A method of displaying advertisements as in claim 7, wherein the time-weighted list of keywords or key phrases is extracted from web pages and emails the user has viewed, sent or received.

9. A method of displaying advertisements as in claim 1, wherein the group of collected advertisements is periodically or continually sorted according to the degree each advertisement matches the type of user as determined by the predictive model.

10. The method of claim 1, wherein the electronic device is a cell phone, smart phone, personal digital assistant, or laptop computer.

11. A system of displaying advertisements, comprising:
    at least one user computer or other electronic device in electronic communication with a network, said user computer or other electronic device comprising a processor or microprocessor operable to:
    periodically download one or more files with advertisements and store said files on the user computer or other electronic device;
    operate a predictive model created without using any demographic or psychographic profile information of the user to generate a user profile based upon user activity on the user computer or other electronic device; and
display on the user computer or other electronic device one or more of the advertisements based on the degree of match between an advertisement and the user profile;
further wherein the user profile is stored on the user computer or other electronic device and is not communicated over the network.

12. A system of displaying advertisements as in claim 11, wherein the predictive model is generated based upon feedback from a group of control users.

13. A system of displaying advertisements as in claim 11, wherein the advertisements placed on the user computer or other electronic device are the same for all users, and does not vary based upon the user profile.

14. A system of displaying advertisements as in claim 11, further wherein the predictive model is generated based upon computer or other electronic device usage behavior of a group of control users.

15. A system of displaying advertisements as in claim 11, wherein the predictive model generates a keyword or key phrase.

16. A system of displaying advertisements as in claim 11, wherein the predictive model generates a time-weighted list of keywords or key phrases.

17. A system of displaying advertisements as in claim 11, wherein the time-weighted list of keywords or key phrases is extracted from web pages and emails the user has viewed, sent or received.

18. A system of displaying advertisements as in claim 17, wherein the advertisements are periodically or continually sorted according to the degree each advertisement matches the user profile.

19. The system of claim 11, wherein the electronic device is a cell phone, smart phone, personal digital assistant, or laptop computer.

* * * * *